(12) United States Patent
Potier

(10) Patent No.: US 9,744,813 B2
(45) Date of Patent: Aug. 29, 2017

(54) TIRE FOR A HEAVY VEHICLE

(75) Inventor: Daniel Potier, Cebazat (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/254,915

(22) PCT Filed: Mar. 1, 2010

(86) PCT No.: PCT/EP2010/052526
§ 371 (c)(1),
(2), (4) Date: Jan. 11, 2012

(87) PCT Pub. No.: WO2010/100102
PCT Pub. Date: Sep. 10, 2010

(65) Prior Publication Data
US 2012/0097310 A1 Apr. 26, 2012

(30) Foreign Application Priority Data
Mar. 4, 2009 (FR) ...................... 09 51366

(51) Int. Cl.
*B60C 15/024* (2006.01)
*B60C 15/04* (2006.01)
(52) U.S. Cl.
CPC ........ *B60C 15/024* (2013.01); *B60C 2200/06* (2013.04); *Y10T 152/10819* (2015.01)

(58) Field of Classification Search
CPC ....... B60C 15/024; B60C 15/00; B60C 15/06; B60C 3/04; B60C 9/0292; B60C 15/0206;
(Continued)

(56) References Cited

U.S. PATENT DOCUMENTS 5,010,938 A * 4/1991 Assaad .................. B60C 15/04
152/539
5,423,366 A * 6/1995 Yamada et al. ............... 152/454
(Continued)

FOREIGN PATENT DOCUMENTS

EP 0 652 120 5/1995
EP 0 749 855 12/1996
(Continued)

OTHER PUBLICATIONS

Machine Translation: JP2000-198327; Sakuno, Hiroaki; No date.*
(Continued)

*Primary Examiner* — Michael H Wilson
*Assistant Examiner* — Kendra Ly
(74) *Attorney, Agent, or Firm* — Cozen O'Connor

(57) ABSTRACT

A tire for a heavy vehicle with a radial carcass reinforcement anchored in two beads by wrapping around bead wires. In a radial plane, radially on the inside of the radially innermost point of the at least one layer of carcass reinforcement and axially on the outside of the geometric center of the bead wire, the radius of curvature at a point on the exterior surface of the bead is greater than the radius of curvature at the point of orthogonal projection of the point of the exterior surface of the bead onto the at least one layer of carcass reinforcement.

7 Claims, 2 Drawing Sheets

(58) Field of Classification Search
CPC ... B60C 15/04; B60C 15/05; B60C 2015/046; B60C 2015/048; B60C 2015/042; B60C 2015/044
USPC .................................................. 152/539–555
See application file for complete search history.

(56) References Cited

U.S. PATENT DOCUMENTS

| | | | |
|---|---|---|---|
| 5,772,811 A | 6/1998 | Ueyoko et al. | |
| 6,478,064 B1 | 11/2002 | Ueyoko | |
| 6,508,285 B2 * | 1/2003 | Ueyoko | 152/539 |
| 6,820,670 B1 * | 11/2004 | Ueyoko | B60C 15/04 152/539 |
| 7,793,693 B2 * | 9/2010 | Nakane et al. | 152/510 |
| 2004/0007305 A1 * | 1/2004 | Ueyoko | 152/552 |
| 2004/0144469 A1 * | 7/2004 | Giraud et al. | 152/535 |
| 2006/0124217 A1 | 6/2006 | Frank et al. | |
| 2008/0035261 A1 | 2/2008 | Maruoka | |

FOREIGN PATENT DOCUMENTS

| | | | | |
|---|---|---|---|---|
| EP | 0 958 946 | 11/1999 | | |
| EP | 0 982 158 | 3/2000 | | |
| JP | 60-104403 | 6/1985 | | |
| JP | 02-200504 | 8/1990 | | |
| JP | 07-164835 | 6/1995 | | |
| JP | 9-132012 | 5/1997 | | |
| JP | 09 132012 | 5/1997 | | |
| JP | 10-230715 | 9/1998 | | |
| JP | 11-129710 | 5/1999 | | |
| JP | 11192820 A * | 7/1999 | | B60C 15/00 |
| JP | 2000016034 A * | 1/2000 | | |
| JP | 2000-62418 | 2/2000 | | |
| JP | 2000198327 A * | 7/2000 | | B60C 15/00 |
| JP | 2001206027 A * | 7/2001 | | B60C 15/06 |
| JP | 2006-213241 | 8/2006 | | |
| JP | 2008-037314 | 2/2008 | | |
| WO | WO 2007/015341 | 2/2007 | | |

OTHER PUBLICATIONS

Machine Translation: JP 11-192820; Honbo, Yoichi; Ando, Shuji; No date.*
Machine Translation: JP2001-206027; Honbo, Yoichi; no date.*
Espacenet Machine Translation: JP2001-206027; Honbo, Yoichi; no date.*
Machine Translation: JP 2000016034 A; Ikeda, Yasutsugu; no date.*

* cited by examiner

TIRE FOR A HEAVY VEHICLE

RELATED APPLICATIONS

This is a U.S. national stage under 35 USC §371 of application No. PCT/EP2010/052526 filed on Mar. 1, 2010.

This application claims the priority of French application no. 09/51366 filed Mar. 4, 2009, the entire content of which is hereby incorporated by reference.

FIELD OF THE INVENTION

The present invention relates to a tire intended to be fitted to a heavy vehicle or piece of machinery of the civil engineering works type.

Although not restricted to this type of application, the invention will be described more particularly with reference to tires for vehicles of the mining type, operating in underground mines and having an axial width greater than or equal to 25 inches.

BACKGROUND OF THE INVENTION

This type of vehicle has the special feature of having to transport heavy loads and of being produced in the most compact possible form, because the space for vehicular traffic is limited in terms of volume. The tires used are thus as small as possible and are therefore not ideally suited to the torques that are to be transmitted.

As far as the habitual design of tires for civil engineering works machinery is concerned, the radial carcass reinforcement, anchored in each bead by being wrapped around a bead wire, is made up of at least one layer of metal reinforcing elements, the said elements being substantially parallel to one another within the layer. The carcass reinforcement is usually surmounted by a crown reinforcement made up of at least two working crown layers of metal reinforcing elements, but which are crossed from one layer to the next, making angles comprised between 15 and 70° with the circumferential direction. Between the carcass reinforcement and the working crown layers there might be layers of reinforcing elements, which are crossed from one layer to the next, and which make angles smaller than 12°, the width of these layers of reinforcing elements usually being less than those of the working layers. Radially on the outside of the working layers there are also protective layers, the reinforcing elements of which are at angles of between 10 and 65°. The crown reinforcement is itself surmounted by a tread.

What is meant by "axial" is a direction parallel to the axis of rotation of the tire, and "radial" means a direction that intersects the axis of rotation of the tire and is perpendicular thereto. The axis of rotation of the tire is the axis about which it turns in normal use.

A circumferential plane or circumferential plane of section is a plane perpendicular to the axis of rotation of the tire. The equatorial plane or circumferential median plane is the circumferential plane that passes through the center or crown of the tread and which divides the tires into two halves.

A radial plane is a plane which contains the axis of rotation of the tire.

The longitudinal direction of the tire, or circumferential direction, is the direction that corresponds to the periphery of the tire and is defined by the direction of running of the tire.

The bead wires used in the tires may be of two types. First of all, there are bead wires of the "braided" type which have a substantially circular cross section. There are also bead bundles which are formed of several layers of cords stacked on top of one another and the cross section of which may adopt various shapes.

In the case of tires for mining vehicles as described hereinabove, it is usually bead bundles that are used, these having a hexagonal cross section. Bead wires of the bead bundle type, which can be produced at a lower cost than bead wires of the "braided" type, usually have a hexagonal cross section, this being relatively close to a circle and leading to a limited bulk. These tires are usually mounted on wheels that have flat seated rims, that is to say that the surfaces of the rim against which the base of the beads of the tire are mounted have a taper of the order of 5° with respect to the axial direction.

The tires for civil engineering work machinery, like the tires described hereinabove, are usually subjected to a pressure of between 4 and 10 bar for the usual loadings and sizes.

In view of the conditions in which they are used and notably in view of the loads transported and therefore the torques which are transmitted through the tires, it has become apparent that these tires display significant wear in the region of the beads, and this limits the life of the tires. Further, while this wear is always significant on this type of tire, it can be relatively different from one tire to another, at the very least in terms of the speed with which it occurs.

SUMMARY OF THE INVENTION

One object of the invention is to provide tires for underground mining vehicles that displayed improved properties in terms of wear and wear that was more even from one tire to another.

This object was achieved according to one aspect of the invention directed to a tire for a heavy vehicle, with a radial carcass reinforcement, comprising at least one layer of reinforcing elements, the tire comprising a crown reinforcement itself radially capped by a tread, the tread being connected to two beads by two sidewalls, each of the beads comprising a bead wire for anchoring the carcass reinforcement into the said beads by wrapping the at least one layer of reinforcing elements around the bead wires, in a radial plane, radially on the inside of the radially innermost point of the at least one layer of carcass reinforcement and axially on the outside of the geometric centre of the bead wire, the radius of curvature at a point on the exterior surface of the bead being greater than the radius of curvature at the point of orthogonal projection of the said point of the exterior surface of the bead onto the at least one layer of carcass reinforcement.

Such a tire according to an embodiment of the invention is more particularly intended for tires of an axial width greater than or equal to 25 inches.

The tire thus described comprises a bead of which the exterior shape, notably the part that comes into contact with the rim during fitting, has a rounded profile the radius of curvature of which allows the tire to be fitted onto its mounting rim with relative ease. Compared with the shape of conventional beads, the greater radius of curvature of the exterior surface of that part of the bead that slides against the rim when the tire according to the invention is being fitted appears to allow the tire to be fitted on the rim more easily. Further, the greater ease with which the bead slips onto the rim appears to prevent the risks of the said bead becoming deformed during the mounting of the tire on the rim which deformation can lead to poor seating of the bead on the rim seat; such poor bead seating on rim seats which have been randomly observed with conventional tires might explain the highly variable rates of bead wear from one tire to another.

Tests conducted with tires according to the invention fitted to vehicles for underground mines did indeed demonstrate tire performance in terms of wear that was superior to the performance of the conventional tires and that further was more even from one tire to another.

The inventor believes these results can be interpreted as showing better seating of the tire on the rim seat without the risk of the tire beads becoming deformed or incorrectly positioned during fitting and thus leading to rapid wearing of this region of the bead. Deformation and/or incorrect bead positioning that varies from one tire to another may explain the variable rates of wear between various tires.

According to one preferred embodiment of the invention, in a radial plane, radially on the inside of the radially innermost point of the bead wire and axially on the outside of the geometric center of the bead wire, the radius of curvature at a point on the said at least one layer of carcass reinforcement is smaller than the radius of curvature at the point of orthogonal projection of the said point of the said at least one layer of carcass reinforcement on the exterior surface of the bead.

According to this embodiment of the invention, the fitting of the bead on a rim seat is made even easier and the risks of deforming the bead become even lower.

According to an advantageous alternative form of the invention, the bead wires are bead bundles, preferably of hexagonal shape. Such bead wires notably hold the carcass reinforcement sufficiently firmly during the steps of tire manufacture and during the step of fitting the said tire on its rim.

Advantageously also, the bead wires of the tire have a ratio of axial width to radial height that is greater than 1.5. Such bead wires spread pressure over a greater width of the base of the bead. Such bead wires are particularly well suited to this type of tire the dimensions of which are small by comparison with the torque transmitted, because of their use in underground mines. Specifically, the tire dimensions dictated by such usage lead to high pressures being exerted by the bead wires on the base of the beads in order to transmit torque satisfactorily. Conventional tires comprising bead bundle type bead wires of hexagonal shape, and with a width to height ratio equal to or close to 1, lead to damage to the base of the beads because of high pressures being applied over small widths. Bead wire shapes that are more elongate in the axial direction, like those proposed according to this alternative form of the invention, will in actual fact, because of the greater widths they offer, allow a better spreading of the pressure forces between the bead and the mounting rim.

Such bead wires have the further advantage, because of a better distribution of pressure, of simplifying the removal of tires once they have become worn.

A reduction in the local intensity of the stresses applied between the base of the bead and the rim have the further advantage of increasing the life of the rims. Specifically, the present-day solutions, because of the high local stresses, lead to rim damage in the regions against which the beads press.

According to one preferred embodiment of the invention, over at least 30 mm of the base of the bead, the angle formed by the said base with a direction parallel to the direction of the axis of rotation of the tire is comprised between 6 and 7.5°. Such a taper at the base of the bead further encourages the simplifying of the mounting of the tire on a rim and further limits the risks of incorrect positioning of the bead on the rim. By comparison with the tapers on conventional tires for this type of application, which make angles in excess of 8° with a direction parallel to the direction of the axis of rotation of the tire, the taper of the base of the bead can be reduced without detrimental effect on the risks of rotation on the rim because the pressure exerted by the bead wire is distributed over a larger bead base width.

Advantageous embodiments of the invention plan that the radial thickness of rubber mass measured between the bead wire, preferably radially on the inside of the radially innermost point of the bead wire, and the exterior surface of the bead is greater than 10 mm. Such thicknesses further encourage improved tire life.

The tires thus produced according to the invention have further demonstrated advantages in terms of mass. Indeed it has been found that, despite the possible enlargement of the base of the bead, the tires according to the invention have a mass that is lower than that of conventional tires. This mass saving can notably be explained by the choice of bead wires that are of flattened shape by comparison with the shape of the bead wires of conventional tires for this type of application. Specifically, the better distribution of pressure on the rim leads to bead wires being designed with a smaller amount of metal than is needed for conventional tires for a given torque that has to be transmitted.

DETAILED DESCRIPTION OF THE DRAWINGS

Figure 1:
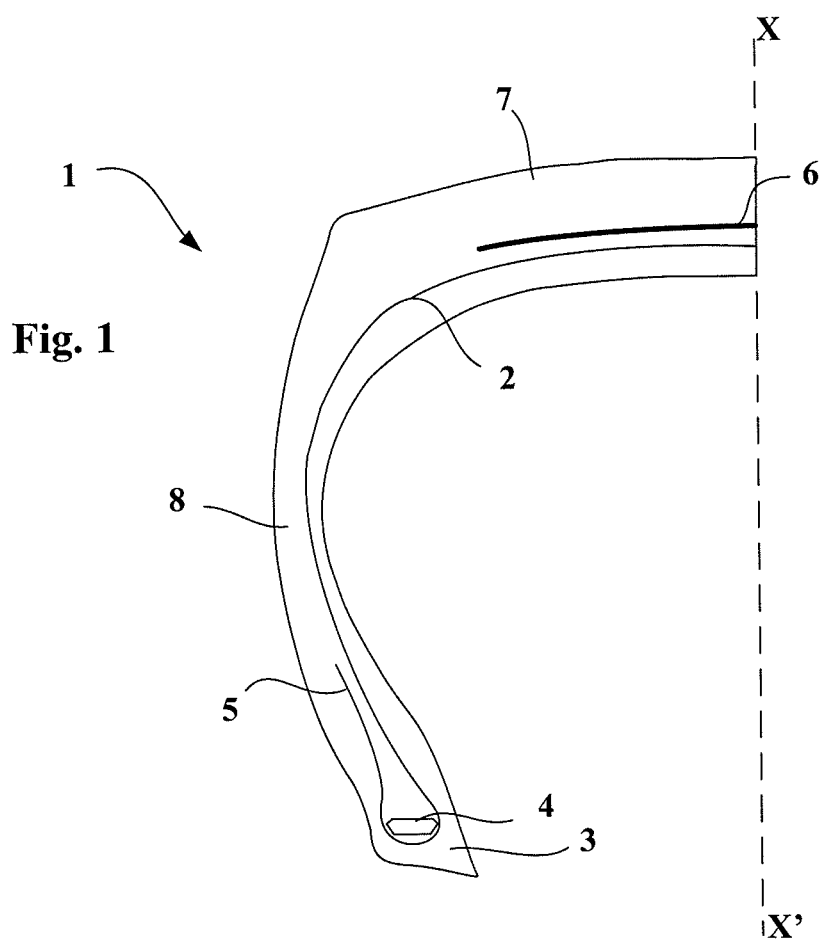
FIG. 1, a schematic depiction of a tire according to an embodiment of the invention, FIG. 2, a schematic depiction of a bead of the tire of FIG. 1.

To make them easier to understand, the figures have not been drawn to scale. FIG. 1 depicts just half a tire which continues symmetrically with respect to the axis X-X' which represents the circumferential median plane of the said tire.

FIG. 1 is a diagram viewed in radial section of a tire 1 produced according to the invention. The tire 1, of size 26.5R25, has a carcass reinforcement layer 2, made up of a ply of inextensible steel metallic cords, anchored in each bead 3 to a bead wire 4 to form a turned-back portion 5. The carcass reinforcement layer 2 is radially surmounted by a crown reinforcement 6. The said crown reinforcement 6 usually consists, on the one hand, of two plies known as working plies and, on the other hand, of two protective plies. The collection of these plies that constitute the crown reinforcement is not depicted in detail in the figures. The working plies are themselves made up of inextensible steel cords parallel to one another within each ply and crossed from one ply to the next, making angles that may be comprised between 15° and 40° with the circumferential direction. The protective plies are generally made up of elastic steel metallic cords, parallel to one another within each ply and crossed with one another from one ply to the next making angles that may be comprised between 15 and 45°. The cords in the radially outer working ply usually are crossed with the cords of the radially inner protective ply. The crown reinforcement is finally surmounted by a tread 7 which is connected to the beads 3 by the sidewalls 8.

The bead wire 4 is of the bead bundle type of hexagonal shape; in accordance with the invention it has a ratio of axial width L (equal to 47 mm) to radial height H (equal to 15 mm) of 3.1, which is therefore higher than 1.5.

Figure 2:
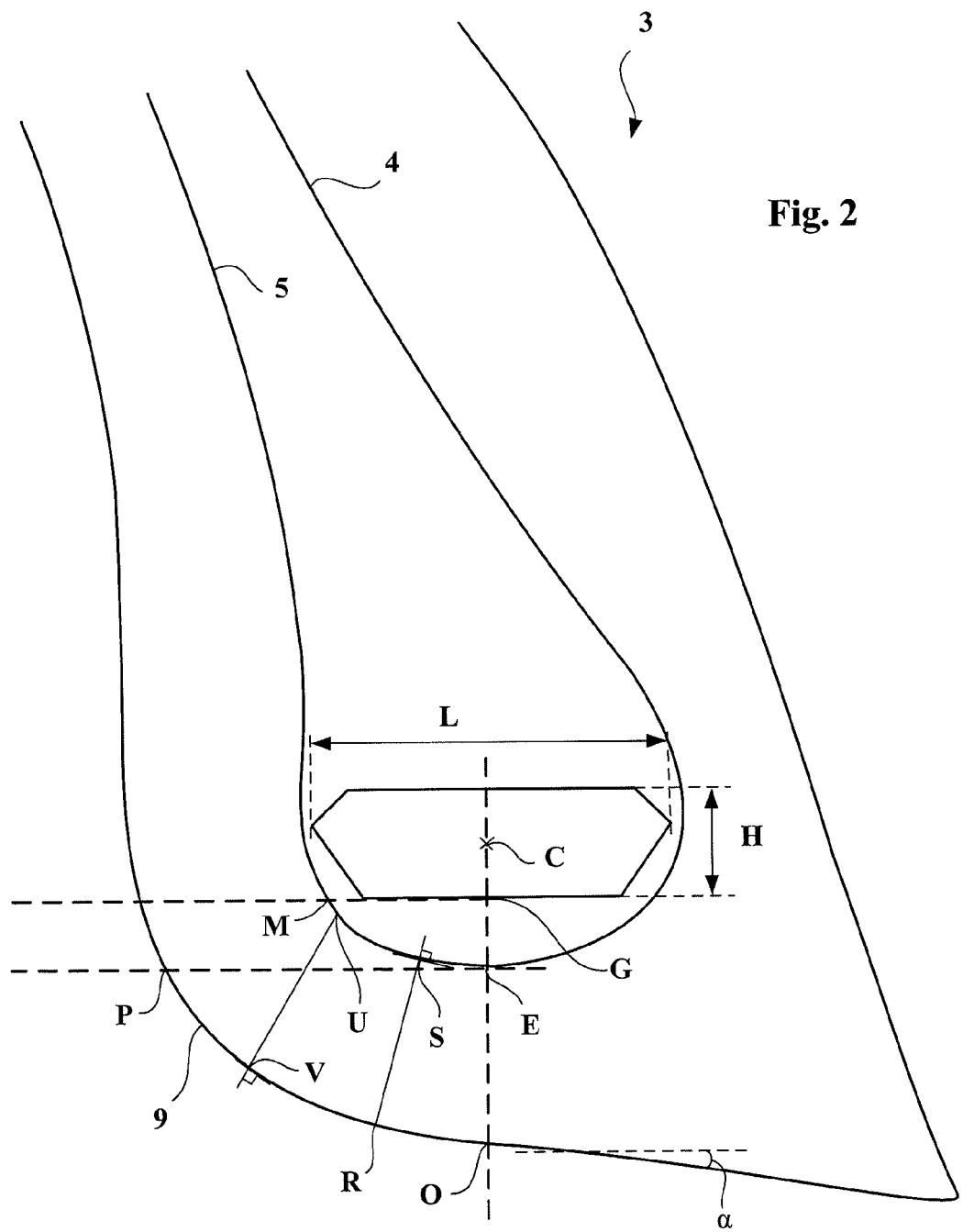

FIG. 2 illustrates a schematic depiction, in radial section, of one bead 3 of the tire of FIG. 1.

According to the invention, in the region of the exterior surface 9 of the bead 3 which surface is delimited by the points O and P, that is to say in a region of the exterior surface 9 of the bead 3 that is radially on the inside of the radially innermost point E of the layer of carcass reinforcement 2 and axially on the outside of the geometric center C of the bead wire 4, the radius of curvature at the point R of the exterior surface 9 of the bead 3 is greater than the radius of curvature at the point S of orthogonal projection of the said point R onto the carcass reinforcement layer 2.

At the point R, the radius of curvature of the exterior surface 9 of the bead 3 is equal to 40 mm.

At the point S, the radius of curvature of the layer of carcass reinforcement 2 is equal to 35 mm.

Likewise, in that region of the layer of carcass reinforcement 2 that is delimited by the points E and M, that is to say in a region of the layer of carcass reinforcement 2 that is radially on the inside of the radially innermost point G of the bead wire and axially on the outside of the geometric center C of the bead wire, the radius of curvature at the point U of the layer of carcass reinforcement 2 is less than the radius of curvature at the point V of orthogonal projection of the said point U onto the exterior surface 9 of the bead 3.

At the point U, the radius of curvature of the layer of carcass reinforcement 2 is equal to 20 mm.

At the point V, the radius of curvature of the exterior surface 9 of the bead 3 is equal to 40 mm.

The tire illustrated in the figures was mounted on a rim of the 25 inches size and inflated to a pressure of 5.5 bar. Compared to the mounting of a conventional tire, that is to say one comprising a bead wire in which the ratio of width to height is substantially equal to 1, the tire appeared to be easier to mount. Likewise, after running on a vehicle simulating use in an underground mine in terms of the loads transported and the torques transmitted, the tire according to the invention appeared to be easier to remove.

Further, the airtightness notably afforded by contact between the rim and the bead region was satisfactory and completely comparable with that of a conventional tire.

Comparative tests were run using a tire according to the one depicted in the figures. The comparison was made using an identical reference tire comprising a bead of the bead bundle type in which the ratio of width to height was substantially equal to one and the width of the base of the bead of which was of course smaller.

The width of the base of the bead of the tire according to the invention was equal to 93 mm and that of the reference tire was equal to 62 mm. The angle α formed by the taper of the base of the bead with a direction parallel to the axis of rotation was equal to 7°, over a length of the said base of the order of 35 mm. The tests notably demonstrated that such a taper made the tire easier to mount on a rim and that, as stated previously, no slippage on the rim during driving was observed.

The tires were tested on one and the same vehicle, this vehicle travelling along the same path simulating a journey that was highly penalizing to tires and driven by the same driver. The journey, which reproduced use of a vehicle driven around in underground mines, notably comprised phases over short distances running in forward gear and in reverse gear, pulling away in forward and reverse gear requiring significant torque to be transmitted starting from a zero speed, and phases of driving over longer distances including cornering.

The tests confirmed, after running for 200 hours, that the tires according to the invention showed no degradation in the bead regions whereas the reference tires were exhibiting damage in the said bead regions that could require the tire to be replaced.

The invention claimed is:

1. A tire for a heavy vehicle with a radial carcass reinforcement comprising at least one layer of reinforcing elements, the tire comprising:
    a crown reinforcement radially capped by a tread, said tread being connected to two beads by two sidewalls, each of said two beads comprising a bead wire for anchoring said carcass reinforcement into said two beads by wrapping said at least one layer of reinforcing elements around said bead wires,
    wherein, in a radial plane, in a first region of the exterior surface of each of said two beads, with said first region being the entire area of the exterior surface of each of said two beads that is radially on the inside of the radially innermost point of said at least one layer of carcass reinforcement and axially on the outside of the geometric center of said bead wire, the radius of curvature at each point on said first region of the exterior surface is greater than the radius of curvature at the point of orthogonal projection of said each point onto said at least one layer of carcass reinforcement, wherein the first region and the area of the orthogonal projection are both arcuate,
    wherein said bead wires have a ratio of axial width to radial height that is greater than 1.5, and
    wherein over at least 30 mm of the base of each of said two beads, an angle formed by the base with a direction parallel to the direction of the axis of rotation of the tire is between 6 and 7.5°.

2. The tire according to claim 1, wherein, in a radial plane, in a second region of said at least one layer of carcass reinforcement, which second region is radially on the inside of the radially innermost point of said bead wire and axially on the outside of the geometric center of said bead wire, the radius of curvature at a point on said second region of said at least one layer of carcass reinforcement is smaller than the radius of curvature at the point of orthogonal projection of said point on said second region onto the exterior surface of said bead.

3. The tire according to claim 1, wherein said bead wire is a bead bundle formed of a plurality of cords stacked on top of one another.

4. The tire according to claim 1, wherein a radial thickness of rubber mass measured between said bead wire and the exterior surface of each of said two beads is greater than 10 mm.

5. The tire according to claim 1, wherein the tire has a width greater than or equal to 25 inches.

6. The tire according to claim 1, wherein a radial thickness of rubber mass measured between the inside of the radially innermost point of said bead wire and the exterior surface of each of said two beads is greater than 10 mm.

7. The tire according to claim 1, wherein said bead wires are of bead bundle type having a hexagonal shape.

* * * * *